(12) United States Patent
Einecke et al.

(10) Patent No.: US 12,702,127 B2
(45) Date of Patent: Aug. 11, 2026

(54) WEED CONTROL WITH AN AUTONOMOUS WORK DEVICE

(71) Applicant: Honda Motor Co., Ltd., Tokyo (JP)

(72) Inventors: Nils Einecke, Offenbach (DE); Mathias Franzius, Offenbach (DE)

(73) Assignee: Honda Motor Co., Ltd., Tokyo (JP)

( * ) Notice: Subject to any disclaimer, the term of this patent is extended or adjusted under 35 U.S.C. 154(b) by 100 days.

(21) Appl. No.: 18/391,539

(22) Filed: Dec. 20, 2023

(65) Prior Publication Data

US 2024/0206455 A1 Jun. 27, 2024

(30) Foreign Application Priority Data

Dec. 22, 2022 (EP) .................................... 22215813

(51) Int. Cl.
*A01M 21/02* (2006.01)
*A01D 34/00* (2006.01)
(Continued)

(52) U.S. Cl.
CPC ........... *A01M 21/02* (2013.01); *A01D 34/008* (2013.01); *G06V 10/945* (2022.01); *G06V 20/56* (2022.01);
(Continued)

(58) Field of Classification Search
None
See application file for complete search history.

(56) References Cited

U.S. PATENT DOCUMENTS 3,990,519 A * 11/1976 Ernst .................... A01B 39/085 56/15.1
4,819,737 A * 4/1989 Frase ..................... A01B 39/14 172/395
(Continued)

FOREIGN PATENT DOCUMENTS

CN 112154721 1/2021
CN 112930847 A * 6/2021 ............. A01D 34/73
(Continued)

OTHER PUBLICATIONS

"Search Report of Europe Counterpart Application", issued on Jun. 5, 2023, p. 1-p. 8.
(Continued)

*Primary Examiner* — Shelley Chen
(74) *Attorney, Agent, or Firm* — JCIPRNET

(57) ABSTRACT

A weed control method for an autonomous work device comprising driving means configured to move the autonomous work device in an outdoor environment, sensor means configured to sense an environment of the autonomous work device and to generate a sensor signal based on the sensed environment, and a control circuit configured to control the driving means to navigate the autonomous work device in the environment based on the sensor signal. The weed control method comprises a step of obtaining a location of a target plant in the environment. The control circuit controls the driving means in a weed suppression mode, to position at least one wheel of the driving means on the computed location of the target plant and to perform a predetermined movement pattern of the autonomous work device while simultaneously maintaining the at least one wheel in an area at the location of the target plant.

14 Claims, 4 Drawing Sheets

(51) Int. Cl.
*G06V 10/94* (2022.01)
*G06V 20/56* (2022.01)
*G06V 10/764* (2022.01)
*G06V 10/82* (2022.01)
*G06V 20/10* (2022.01)

(52) U.S. Cl.
CPC ............ *G06V 10/764* (2022.01); *G06V 10/82* (2022.01); *G06V 20/188* (2022.01)

(56) References Cited

U.S. PATENT DOCUMENTS

| | | | | |
|---|---|---|---|---|
| 2020/0042009 | A1 | 2/2020 | Yang et al. | |
| 2022/0117217 | A1* | 4/2022 | Wurden | G05D 1/0212 |
| 2024/0053748 | A1* | 2/2024 | Wurden | G05D 1/0088 |

FOREIGN PATENT DOCUMENTS

| | | | | | |
|---|---|---|---|---|---|
| CN | 113100217 | | | 7/2021 | |
| CN | 215835988 | U | * | 2/2022 | |
| CN | 216087662 | U | * | 3/2022 | |
| CN | 114747561 | | | 7/2022 | |
| CN | 114793492 | A | * | 7/2022 | A01B 39/22 |
| CN | 115139701 | | | 10/2022 | |
| CN | 115211251 | | | 10/2022 | |
| CN | 115250651 | A | * | 11/2022 | A01M 21/02 |
| CN | 218550579 | U | * | 3/2023 | |
| EP | 3262934 | | | 1/2018 | |
| JP | 2001025306 | A | * | 1/2001 | |
| JP | 2011120573 | | | 6/2011 | |
| JP | 2011229463 | A | * | 11/2011 | |
| KR | 101341793 | | | 12/2013 | |
| KR | 1524784 | B1 | * | 1/2016 | |
| KR | 20160003538 | | | 1/2016 | |
| KR | 20160003538 | A | * | 1/2016 | A01M 21/02 |
| KR | 101799977 | | | 11/2017 | |
| WO | 2015064780 | | | 5/2015 | |
| WO | WO-2015064780 | A1 | * | 5/2015 | A01B 69/00 |
| WO | WO-2022086873 | A1 | * | 4/2022 | G05D 1/646 |

OTHER PUBLICATIONS

A S M Mahmudul Hasan et al., "A survey of deep learning techniques for weed detection from images", Computers and Electronics in Agriculture, May 2021, pp. 1-52.

* cited by examiner (1) $\frac{z}{h} = \frac{y}{f}$; $\Rightarrow$ (2) $z = \frac{y}{f} h$;

WEED CONTROL WITH AN AUTONOMOUS WORK DEVICE

CROSS-REFERENCE TO RELATED APPLICATION

This application claims the priority benefits of European Patent Application No. 22 215 813.1 filed on Dec. 22, 2022. The entirety of the above-mentioned patent application is hereby incorporated by reference herein and made a part of this specification.

BACKGROUND

Technical Field

The invention concerns the field of autonomous garden devices, in particular autonomous lawn-mowing devices. The invention also concerns the field of weed control in gardening and agriculture.

Description of Related Art

The market for autonomous work devices is expanding each year. One economically significant example for autonomous work devices are autonomous lawn-mowing devices (autonomous lawnmowers, lawn-mowing robots), which are self-propelled, autonomously controlled and can perform the task of mowing the lawn in a working area without requiring direct interaction by the user, once the initial configuration of the autonomous lawn-mowing device has been set up. Deploying the autonomous lawn-mowing device increases the comfort for the user owning a garden significantly by reducing the time he has to attend to the garden in person. Nevertheless, the basic concept of operation of an autonomous lawnmower has not changed for many years. Essentially, the autonomous lawnmower moves randomly in an environment including the working area, which originally had been defined by an electric boundary wire. Recent examples of the autonomous lawnmower may navigate in the environment using a camera and image processing of images acquired by the camera for navigation purposes. The autonomous lawnmower is self-propelled, which means it has the capability to move across the working area being driven by own driving means, such as an electric motor that drives wheels of the lawnmower, and without the user (gardener) needing to push the working machine. Nevertheless, it is still necessary, that the gardener inspects the working machine regularly and monitors its working performance, e.g. the quality of the mowed lawn. In particular, the autonomous lawnmower fails in providing a capability to tackle the problem of unwanted weeds growing in the grass area of the lawn that adversely affects a perceived quality of the lawn in the eyes of most gardeners.

Thus, the gardener is still required to detect visually unwanted weed plants in the grass, and to tackle the detected weed plants manually. There exist proposals for tackling unwanted weed plants in agriculture, which are based on applying chemicals (herbicides) or using extensive mechanical force for weeding that involve drilling or hoeing techniques. However, applying chemicals in the garden area is undesired or even strictly rejected by at least some gardeners. The existing approaches for mechanically tackling unwanted weed plants require complex tools and a significant amount of energy, which prevent currently their application in the contested volume market for autonomous gardening tools for private individuals and restrict these approaches to commercial uses.

In order to detect unwanted weeds, an autonomous work device may use cameras and 3-dimensional (3D) sensors in order to detect and locate weeds. There currently exist approaches to detect weed and to generate a digital map of an agricultural environment that includes the locations of the detected weeds. EP 3 262 934 A1 uses such digital map to apply herbicides selectively at the locations of the detected unwanted weeds. Alternatively, removing the weeds may be performed using cutting blades or some kind of tine arrangement as the patent KR 101 799 977 B1 discloses in the specific field of robotic devices for fruit farms.

Nevertheless, there remains the objective of improving existing solutions of suppressing weed in a lawn area in the garden environment.

SUMMARY

A weed control method for an autonomous work device, a computer program, an autonomous work device and a weed control system defined in the independent claims provide an advantageous solution.

The dependent claims define further advantageous embodiments of the weed control method and the autonomous work device.

The weed control method for an autonomous work device according to a first aspect is for an autonomous work device that comprises driving means configured to move the autonomous work device in an outdoor environment. The autonomous work device further comprises sensor means configured to sense an environment of the autonomous work device and to generate a sensor signal based on the sensed environment, and a control circuit configured to control the driving means to navigate the autonomous work device in the environment based on the sensor signal. The weed control method comprises obtaining a location of a target plant in the environment. The control circuit controls the driving means in a weed suppression mode, to position at least one wheel of the driving means on the computed location of the target plant and to perform a predetermined movement pattern of the autonomous work device while simultaneously maintaining the at least one wheel in an area at the location of the target plant.

The area at the location of the target plant may include the location of the target plant, and a predetermined area around the location of the target plant including the location of the target plant.

The area at the location of the target plant may have the size of the footprint of the wheel on the ground in the work area. In this specific case, the autonomous work device positions the wheel on the location of the target plant and maintains the at least one wheel on the location of the target plant while performing the predetermined movement pattern.

The method solves the problem using the fact that autonomous work devices operate for extended periods of time in the work area and growth of weed is comparatively slow. Weed in conjunction with desired plants poses a problem in a garden in case the growth of weed is faster than the growth of the desirable plants, e.g. grass, competing for the same natural resources. For keeping weed under control, it suffices to keep the growth rate of a weed sufficiently low when compared to the growth rate of the desired plants. By exerting repeatedly mechanical stress on detected weeds in order to reduce their growth rate, the growth of the weed is slowed compared to the growth rate of the desired plants, which do not experience the same level of mechanical stress. The method performs actuation using the existing robot drive wheels, e.g. by turning the wheels on the location of the detected weed regularly and for predefined periods. Thus, the method dispenses with using potentially dangerous means of weed control, and no additional cost for actuation devices are required.

Operating autonomous work devices for erasing weed in spaces that are shared with humans poses potentially dangers to the humans, as state-of-the-art work devices use techniques, which involve thermal means, chemical means, electric means or mechanical means and tools for weeding. The thermal means may include flaming using gas burners. The chemical means base on applying herbicides, which may enrich in the soil over time. The electric means use high voltage for generating sparks, while conventional mechanical tools involve using tines, sharp drills or similar tools. Operating these means in the same areas with a human requires implementing additional measures for guarantying safety of the human.

Furthermore, all the these methods require additional hardware, which increases complexity of the work device due to specific tools for the weed suppression task and tanks for consumables such as gas or herbicides, which not only add hardware cost, but also add to running cost due to regularly refilling tanks for the consumables.

The method for suppressing weed does not require any additional hardware for actuators or consumables.

The danger posed to the human in the shared space by performing the method for controlling weed does not exceed the danger that a conventional autonomous work mower poses.

An occasional misclassification of detected plants as weed does not cause catastrophic harm to the misclassified desired plant.

According to an embodiment of the weed control method, obtaining the location of a target plant in the environment comprises detecting a plant in the environment based on the sensor signal, determining whether the detected plant is the target plant, and computing the location of the target plant.

The method for suppressing weed does not require any additional hardware for sensors as the on-board sensor, e.g. for navigation of the autonomous work device is used. An occasional misclassification of detected plants as weed does not cause catastrophic harm to the misclassified desired plant.

The weed control method may include obtaining the location of the target plant in the environment comprises obtaining, via a user interface (82), an input of a user including the location of the target plant. According to an embodiment of the weed control method, the method comprises recording the location of the identified target plant in a map stored in a memory.

The weed control method according to an embodiment comprises switching the autonomous work device into operating in the weed suppression mode at predetermined time intervals. In the weed suppression mode, the method comprises the steps of retrieving recorded locations of the target plant in the work area from the map, moving the autonomous work device to each of the retrieved locations, performing at each of the retrieved locations, steps of positioning at least one wheel of the driving means on the retrieved location of the target plant, performing the predetermined movement pattern of the autonomous work device while simultaneously maintaining the at least one wheel in the at least one area at the retrieved location of the target plant.

In an embodiment, the weed control method comprises a step of receiving, via an interface, data for defining desired plants and for defining weed from at least one of a manufacturer, a service provider and at least one user of the autonomous work device.

The weed control method according to an embodiment comprises outputting, via a user interface, image information of the detected plant, receiving, via the user interface, a user input including information whether the detected plant is a desired plant or weed, and learning a classifier used in the determining step to determine whether the detected plant is the desired plant or weed based on the received user input.

The weed control method according to an embodiment comprises receiving a user input defining at least one movement parameter of the predetermined movement pattern for determining an amount of stress exerted by the autonomous work device on the target plant.

According to an embodiment, the weed control method comprises selecting at least one movement parameter of the predetermined movement pattern for determining the amount of stress exerted by the autonomous work device on the target plant based on at least one of a plant species of the target plant, a plant species of plants surrounding the target plant, and a region of a working area in which the target plant is located.

The weed control method according to an embodiment comprises determining a size of the detected weed and storing the determined size of the detected weed in association with the computed location of the detected weed. The method monitors the stored size of the detected weed over a predetermined time interval, and, in case the stored size of the detected weed increases or remains the same size over the predetermined time interval, the method proceeds by at least one of: amending the at least one movement parameter of the predetermined movement pattern or selecting another predetermined movement pattern for increasing the amount of stress on the detected weed on the associated location, and outputting, to a user, a notification on the detected weed including at least information on the associated location of the detected weed.

In the weed control method according to an embodiment the autonomous work device includes the sensor means comprising at least one camera sensor, and the step of detecting the plant includes performing image processing of the sensor signal, in particular detecting the plant and determining the target plant using a classification algorithm or a deep neural network.

According to an embodiment of the weed control method performing the predetermined movement pattern includes positioning the at least one wheel on the computed location of the target plant, setting a rotational speed of the at least one wheel to zero, and moving at least one other wheel with a rotational speed different from zero for a predetermined time or for a predetermined angle.

The term predetermined angle refers to a rotational angle of the at least one other wheel around its axis.

In the weed control method according to an embodiment, the rotational speed different from zero corresponds essentially to a rotational speed of the wheel and the at least one other wheel during standard operation of the autonomous work device.

A computer program with program-code means according to third aspect is configured to execute the steps according to one of the embodiments of the weed control method of the first aspect, when the program is executed on a computer or a digital signal processor.

A digital storage medium includes machine-readable instructions, which when executed on a computer or digital signal processor cause the computer or digital signal processor to perform the weed control method according to an embodiment of the first aspect.

An autonomous work device according to a fourth aspect comprises driving means configured to move the autonomous work device in an outdoor environment, sensor means configured to sense an environment of the autonomous work device and to generate a sensor signal based on the sensed environment, and a control circuit configured to control the driving means to navigate the autonomous work device in the environment based on the sensor signal.

The control circuit is configured to obtain a location of a target plant in the environment. The control circuit is configured to switch into a weed suppression mode, to control the driving means to position at least one wheel of the driving means on the location of the target plant and to perform a predetermined movement pattern of the autonomous work device while simultaneously maintaining the at least one wheel on the location of the target plant.

The autonomous work device may include the control circuit configured to detect a plant in the environment based on the sensor signal, to determine whether the detected plant is the target plant, and to compute the location of the target plant.

In an embodiment of the autonomous work device, the autonomous work device is an autonomous lawnmower.

A weed control system according to a fifth aspect includes an autonomous work device according to the fourth aspect and an external user device. The external user device is configured to determine the location of the target plant based on an input of a user, and to transmit the determined location via a communication unit of the external user device to the autonomous work device.

BRIEF DESCRIPTION OF THE DRAWINGS

The description of embodiments of the weed control system refers to the attached figures.

In the figures, same reference signs denote same or corresponding elements. The description of the figures dispenses with a discussion of same reference signs in different figures wherever deemed possible without adversely affecting comprehensibility.

DESCRIPTION OF THE EMBODIMENTS

Figure 1:
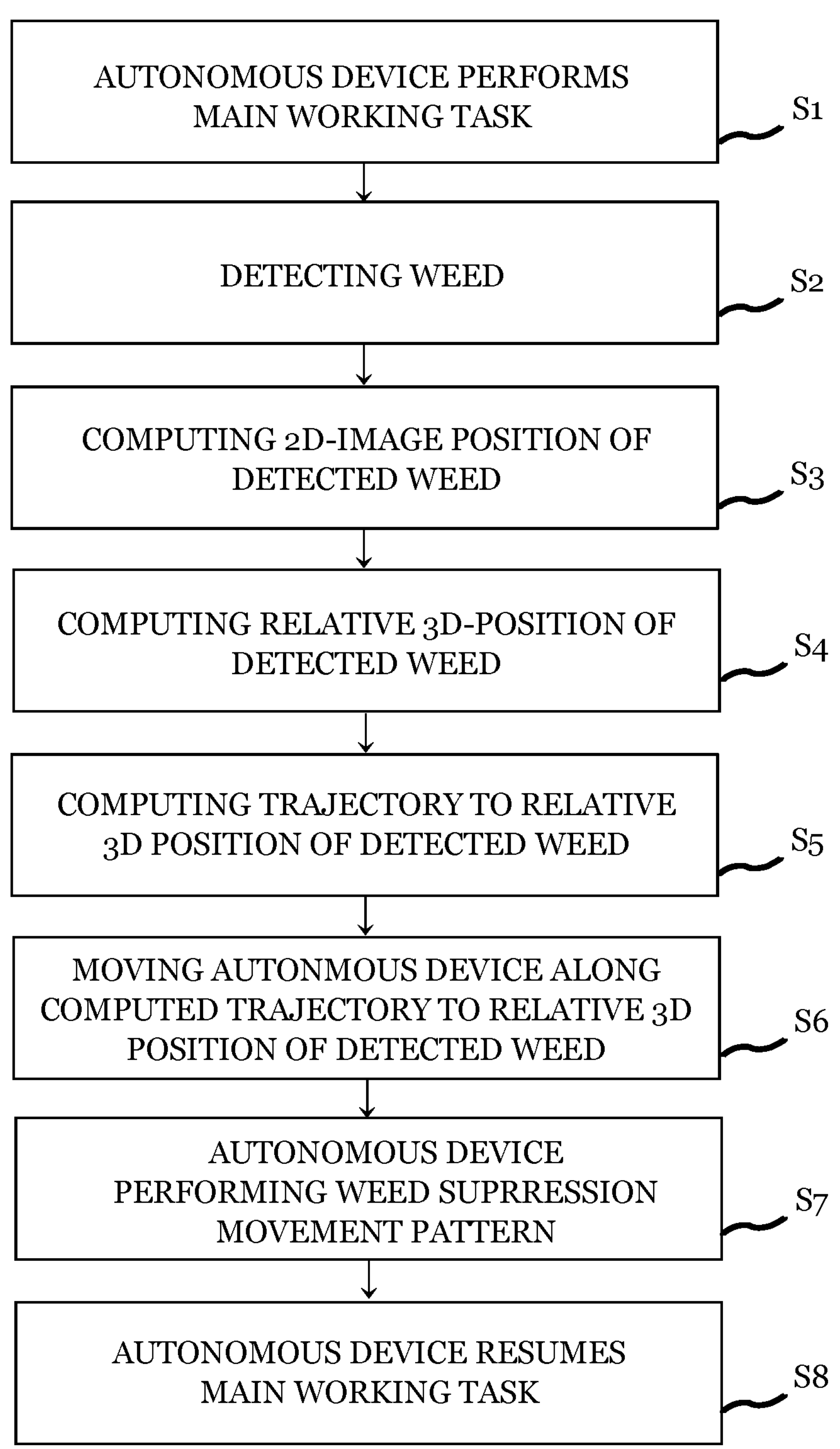
FIG. 1 provides a simplified flowchart of a method of controlling weed according to an embodiment.

FIG. 1 provides a simplified flowchart of a method of controlling weed 12 according to an embodiment.

In step S1, the autonomous work device 2 performs the main working task in the work environment. In particular, the autonomous work device 2 may mow grass on a lawn area in a garden environment.

The autonomous work device 2 performs the main working task in the work environment in a standard operating mode. In the standard operating mode, the autonomous work device 2 mows the grass of the lawn area.

While operating in the standard operating mode, a sensor means 5 of the autonomous work device 2, e.g. comprising a camera sensor, senses the environment of the autonomous work device 2 and generates a sensor signal based on the sensed environment.

While operating in the standard operating mode, a control circuit 70 controls the driving means 6 of the autonomous work device 2 to navigate the autonomous work device 2 in the environment based on the sensor signal provided by the sensor means 5.

While operating in the standard operating mode, the autonomous work device 2 continuously analyzes the sensor signal. Analyzing the sensor signal includes detecting plants in the sensed environment based on the acquired sensor signal.

Analyzing the sensor signal further includes determining whether detected plants in the sensed environment are wanted plants, e.g. grass in a lawn area, or whether detected plants in the sensed environment are unwanted plants, e.g. weed 12 in the lawn area.

In step S2, the autonomous work device 2 detects weed 12 in the work environment. The detected weed 12 represents a target plant, which is to be suppressed in the working environment.

In particular, the autonomous work device 2 may classify any detected plant as either desired plant or as weed 12.

Additionally, the autonomous work device 2 may classify any detected plant according to a plant species of the detected plant.

Detecting the plant and classifying the plant in step S2 may include performing image processing of the sensor signal, in particular detecting the plant and determining the target plant using a classification algorithm or a deep neural network.

Additionally, the autonomous work device 2 may classify detected plants as either belonging to a known plant species or to an unknown plant species.

If classifying a detected plant in the category "unknown plant species", the autonomous work device 2 may output via a user interface, image information of the detected plant in the category "unknown plant species" to a user. The user interface may receive a user input including information whether the detected plant is in a category "wanted plant" or in a category "weed". The autonomous work device 2 may then proceed with learning a classifier used in the determining step to determine whether the detected plant is the desired plant or weed 12 based on the received user input and thereby improve its classification capabilities.

The autonomous work device 2 may be configured to receive via an interface data for defining desired plants and for defining weed 12 from at least one of a manufacturer of the autonomous device 2, a service provider providing services around operation around the autonomous work devices 2, gardeners or experts, members of an online community directed at gardening, an owner and a user of the autonomous work device 2.

Additionally, the autonomous work device 2 may determine a size of each detected weed 12. The determined size of the detected weed 12 may include at least one of a size of an area on a ground plane of the working area, which the detected weed 12 covers, and a maximum or an average height of the detected weed 12 in a vertical direction above the ground plane of the working area.

The determined size of the detected weed 12 may further determine the area at a location of the detected weed 12 corresponding to the target plant 12, at which while performing a predetermined movement pattern of the autonomous work device 2 at least one wheel 61, 62,62,63 is maintained.

The determined size of the detected weed 12 may correspond to the area on the ground plane of the working area at the location of the detected weed 12 corresponding to the target plant 12.

In step S3, the autonomous work device 2 computes the 2D-image position of the detected weed 12 in an acquired image of the sensor signal.

In step S4, the autonomous work device 2 computes a relative 3D-position of the detected weed 12 in the work area relative to the sensor 5 based on the computed 2D-image position of the detected weed 12.

The autonomous work device 2 may compute a location of the detected weed 12 in the work environment based on the relative 3D-position of the detected weed 12 and the location of the autonomous work device 2 in the work environment at the time of taking the image.

The autonomous work device 2 may record the computed location of the identified target plant 12 in a map stored in a memory 71 of the autonomous work device 2.

Alternatively, or additionally, the autonomous work device 2 may record the computed location of the identified target plant 12 in a map stored in a memory of at least one of a base station 7 or a server S arranged remotely to the work area.

Alternatively, or additionally, the autonomous work device 2 may record the identified target plant 12 associated with the computed location of the identified target plant 12 in a file stored in a memory 71.

Additionally, the autonomous work device 2 may record the determined size of the identified target plant 12 associated with the computed location of the identified target plant 12 in a file stored in a memory 71.

In step S5, the autonomous work device 2 computes a trajectory in the work area starting at a current position of the autonomous device 2 in the work area and ending at the computed relative-3D position of the detected weed 12.

In step S6, the autonomous work device 2 moves along the computed trajectory to the relative 3D-position of the detected weed 12. In particular, the driving means 6 operating in the in the weed suppression mode, positions at least one wheel 61, 62, 63, 64 of the driving means 6 in the area at the computed location of the target plant 12.

Alternatively, the driving means 6 operating in the in the weed suppression mode, positions at least one wheel 61, 62, 63, 64 of the driving means 6 on the computed location of the target plant 12.

The area at the computed location of the target plant 12 may be determined based on the size of the target plant 12 (detected weed 12).

The area at the computed location of the target plant 12 may be selected with an area size from a plurality of predetermined areas with individual area sizes by the autonomous work device 2. The autonomous work device 2 may select at least one movement parameter of a predetermined movement pattern for determining the amount of stress exerted by the autonomous work device 2 on the target plant based on at least one of a determined plant species of the target plant, a plant species of plants surrounding the target plant, and a region of a working area in which the target plant is located.

The predetermined movement pattern of the autonomous device 2 may include a linear movement or a turning movement of the autonomous device 2, for example.

The at least one movement parameter of the predetermined movement pattern may include at least one of a time during which a wheel 61, 62, 63, 64 of the driving means 6 is positioned on the location of the target plant, a turning angle of a turning movement of the autonomous device 2 around the wheel 61, 62, 63, 64 of the driving means 6 that is positioned in the area at the location of the target plant, a rotation rate of a turning movement turning movement of the autonomous device 2 around the wheel 61, 62, 63, 64 of the driving means 6 that is positioned in the area at the location of the target plant, a number of repetitions of a back-and-forth movement of the autonomous work device 2 during which the autonomous work device 2 moves with a wheel 61, 62, 63, 64 over the location of the target weed, and an acceleration or deceleration of the wheel 61, 62, 63, 64 positioned in the area at the location of the target plant 12.

The at least one movement parameter may include rotational speeds or speed profiles of the wheels 61, 62, 63, 64 of the driving means 6.

In step S7, the autonomous work device 2 performs the predetermined movement pattern of the autonomous work device 2 at the computed relative 3D-position of the detected weed 12 while simultaneously maintaining the at least one wheel 61, 62, 63, 64 in the area at the location of the target plant 12.

The autonomous work device 2 performing the predetermined movement pattern includes positioning the at least one wheel 61, 62, 63, 64 in the area at the location of the target plant, and may further comprise setting a rotational speed of the at least one wheel 61, 62, 63, 64 to zero, and moving at least one other wheel 61, 62, 63, 64 with a rotational speed different from zero for a predetermined time.

The predetermined movement pattern may correspond to the autonomous work device 2 performing a turning movement around the wheel 61, 62, 63, 64 positioned on the location of the target plant.

The turning movement may correspond to a 180° turn of the autonomous work device 2, for example.

Alternatively, the turning movement may correspond to a 360° or any other turning angle of the turning movement of the autonomous work device 2.

The at least one wheel 61, 62, 63, 64 and the at least one other wheel 61, 62, 63, 64 are preferably those wheels 61, 62, 63, 64 of the autonomous work device 2, which carry most of the weight of the autonomous work device 2. In the autonomous work device 2 depicted in FIG. 2, the left and right rear wheels 61, 62 represent an obvious choice for the wheel 61, 62, 63, 64 positioned in the area at the location of the target plant 12 and the other wheel 61, 62, 63, 64 moving with the rotational speed different from zero for a predetermined time or for a predetermined angle.

The rotational speed different from zero may correspond essentially or be a same rotational speed as a rotational speed of the wheel 61, 62, 63, 64 and the at least one other wheel 61, 62, 63, 64 during standard operation of the autonomous work device 2.

The rotational speed different from zero may be a constant velocity.

Alternatively, the rotational speed different from zero may include a velocity profile over time. Accelerating and decelerating during running of the velocity profile may exert further mechanical stress on the target plant.

The rotational speed different from zero of the other wheel 61, 62, 63, 64 while performing the predetermined movement pattern and the predetermined time may be selected based on a classified weed species of the target plant 12.

Additionally, or alternatively, the rotational speed different from zero of the other wheel 61, 62, 63, 64 while performing the predetermined movement pattern and the predetermined time may be selected based on a classified weed species of the plants detected and classified with regard to their plant species that are arranged in a predefined region in the working area around the target plant 12.

The autonomous work device 2 may provide the capability to receive a user input defining at least one movement parameter of the predetermined movement pattern for determining an amount of stress exerted by the autonomous work device 2 on the target plant. Thus, the amount of stress may be adapted according to the knowledge of the user to at least one of the specific soil conditions, plants, and weather conditions of a particular garden environment including the working area and a time.

In step S8, the autonomous work device 2 resumes performing its main working task in the work environment and switch to operation in the standard operating mode.

Furthermore, the weed control method may switch the autonomous work device 2 into operating in the weed suppression mode at predetermined time intervals. The predetermined time interval may last some hours or even some days.

After the predetermined time interval has elapsed, and the autonomous work device 2 has switched in the weed suppression mode, the autonomous work device 2 retrieves recorded locations of the weed 12 in the work area from the map or the file.

The autonomous work device 2 proceeds with sequentially moving the autonomous work device 2 to each of the retrieved locations retrieved from the file or the map.

At each of the retrieved locations corresponding to a location of a target plant 12, the autonomous work device 2 performs the steps of weed suppression method, including positioning, according to step S7, at least one wheel 61, 62, 62, 63 of the driving means 6 in the area at the retrieved location of the respective target plant 12, and performing, the predetermined movement pattern (weed suppression moving pattern) of the autonomous work device 2 while simultaneously maintaining the at least one wheel 61, 62, 63, 64 in the area at the retrieved location of the respective target plant 12.

The method may include determining a size of the respective detected weed 12 and recording the determined size of respective detected weed 12 in association with the respective computed location of the detected weed 12 for each time it detects the weed and/or each time it performs the predetermined movement pattern on the location of the respective target weed 12.

The method may include monitoring the stored size of the target weed 12 over a predetermined time interval based on the stored file. Monitoring the target plant 12 may include determining whether the stored size of the target plant 12 increases or remains the same size during the predetermined time interval. In case of determining a decrease of the size of one target plant 12 does not occur, the method may proceed by performing at least one of the following actions for this persistent target plant 12: The autonomous work device 2 may amend the at least one movement parameter of the predetermined movement pattern or selecting another predetermined movement pattern in manner that is suitable for increasing the amount of stress on the persistent target plant 12 for the associated location.

For example, the at least one movement parameter may be amended to increase a time or a turning angle for a movement pattern on the location of the persistent target plant 12.

The autonomous work device 2, or the weed control system 1, may output to a user, a notification on the target plant 12, whose size does not decrease. For example, the notification may include at least information on the associated location of the target plant 12 in the working area, thereby enabling the user to take further actions to suppress the persistent target plant 12. The weed control system 1 may include the autonomous work device 2 being configured to guide the user to the location of such persistent target plant 12, which is determined not to decrease sufficiently during the predetermined time interval.

Figure 2:
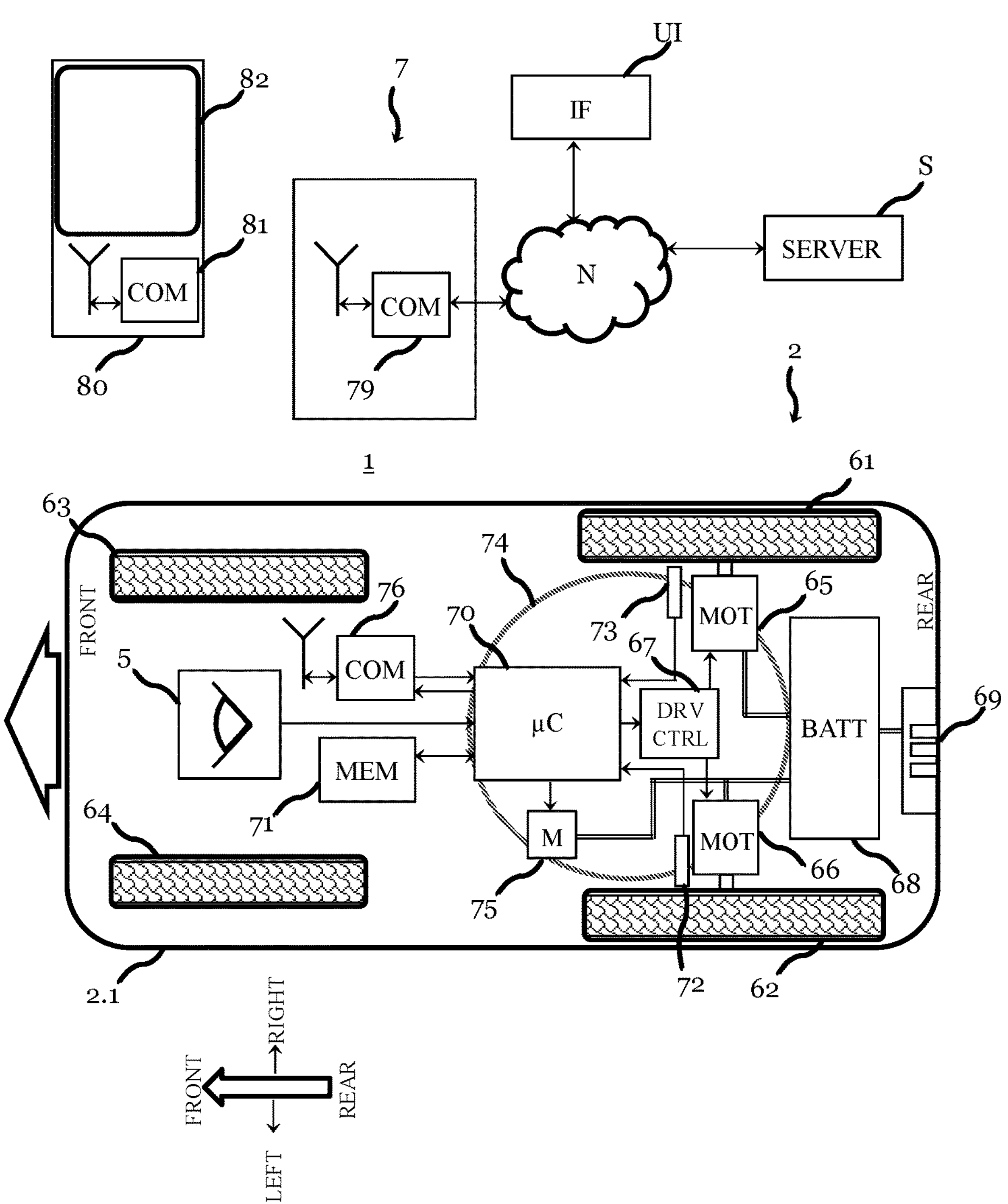
FIG. 2 provides a simplified block diagram of an autonomous work device for implementing the method of controlling weed according to the embodiment.

FIG. 2 provides a simplified block diagram of an autonomous work device for implementing the method of controlling weed according to the embodiment.

The autonomous work device 2 comprises a driving means 6, which enables to navigate the autonomous work device 2 in the outdoor environment, which includes the working area.

The driving means 6 may include wheels 61, 62, 63, 64 and at least one motor to drive the wheels 61, 62, 63, 64. The following configuration of the autonomous work device 2 and the driving means 6 represents one specific example for the autonomous work device 2. The method may use different configurations of the autonomous work device 2 than the configuration shown in FIG. 2.

The autonomous work device 2 comprises a pair of rear wheels 61, 62, which are driven by respective electric motors 65, 66.

The autonomous work device 2 of FIG. 2 comprises front wheels 63, 64, which are not driven but may freely follow a movement of the autonomous work device 2 in response to a relative rotation of the rear wheels 61, 62. The front wheels 63, 64 may be caster wheels (passive wheels). Thus, the direction of the autonomous work device 2 is controlled by controlling a rotational speed of the rear wheels 61, 62 relative to each other.

The electric motors 65, 66 are controlled by a drive controller 67 and supplied with electric energy drawn from a rechargeable battery 68. The rechargeable battery 68 may be recharged via a charging interface 69, which a charging unit of the base station 7 automatically connects with a charger when the autonomous work device 2 arrives at the base station 7. The drive controller 67 is furthermore connected to a control circuit 70, which is configured to perform the method steps necessary for generating a representation of the working area, for navigating the autonomous work device 2 in the working area based on a generated representation of the working area and based on sensor signals provided by the sensor 5.

The representation of the working area may include a map of the working area in a machine-readable format, which the control circuit 70 may read and interpret. The representation of the working area may be stored in a memory 71 connected to or integrated in the control circuit 70.

The control circuit 70 is connected to movement sensors 72, 73 and the memory 71. FIG. 2 depicts the movement sensors 72 and 73 as wheel rate sensors, which preferably detect the rotation rates of the rear wheels 61, 62.

Alternatively, wheel rate sensors might be arranged at the front wheels 63, 64 requiring respectively adapted differential drive equations. Wheel rate sensors at the rear wheels 61, 62 could reduce sensor errors due to wheel slip.

The sensor 5 of the autonomous lawnmower may include a sensor suite comprising a plurality of sensors for sensing the environment of the autonomous work device 2, in addition to the movement sensors 72, 73 already mentioned.

The sensor 5 may include at least one of an inertial measurement unit (IMU), a g-sensor, visual sensors, LIDAR- or RADAR-sensors, a global navigation satellite system (GNSS) sensor.

The sensor 5 also may include a camera sensor. The camera sensor is arranged to acquire images from a field-of-view 5.1 essentially towards the front of the autonomous work device 2 in a main moving direction of the autonomous working device 2. The camera sensor 5 is often arranged in an elevated position providing a field-of-view 5.1 towards the front of the chassis 2.1 of the autonomous work device 2. The elevated position towards the front of the chassis 2.1 offers advantages for using the camera sensor for navigating in the working area and detecting obstacles based on acquired camera images.

The sensor 5 may include a plurality of camera sensors, which may also include camera sensors with a field-of-view 5.1 towards directions that diverge from the main movement direction towards the front of the chassis 2.1 of the autonomous work device 2. For example, a camera sensor that is directed sideways, e.g. towards the left or the right of the chassis 2.1 of the autonomous work device 2 may provide images in the sensor signal, that may be used to detect weed 12. Using sideway looking camera sensors for detecting weed in the working area in addition to the camera sensor with the field-of-view 5.1 towards the front of the chassis 2.1 may even improve the detection and classification of plants 12, 13 in particular in combination with a map of the working environment.

When the autonomous work device 2 is moving around the work area, the control circuit 70 obtains sensor signals including measured values and sensor data provided by at least a subset of the sensors 5 arranged in the autonomous work device 2 and stores the sensor data including the measured values in the memory 71. Based on the acquired sensor data, the control circuit 70 computes a trajectory for the autonomous work device 2 in order to perform its work task, and position and orientation of the autonomous work device 2 along the trajectory can be corrected to arrive at a target location starting from the current position and moving along the computed trajectory.

The autonomous work device 2 may perform a main working task as an autonomous lawnmower. The autonomous work device 2 of FIG. 2 comprises a mowing assembly 74 operated by a mower drive 75, that, e.g., includes an electric motor for driving blades or cutters of the mowing assembly 74, controlled by mow control signals generated and output by the control circuit 70.

The autonomous work device 2 may include a communication unit 76 configured to provide a wireless communication capability for the autonomous work device 2. The communication unit 76 may include at least one wireless transceiver connected with at least one antenna arranged on or integrated with the chassis 2.1 of the autonomous work device 2.

The control circuit 70 may perform a bi-directional communication via the communication unit 76 with an external server S. In particular, the control circuit 70 may perform the bi-directional communication via the communication unit 76, via a communication gateway 79 of the base station 7 to an external network N and further to the external server S, or even plural external servers S.

The control circuit 70 may perform a bi-directional communication via the communication unit 76 with an external user interface UI. In particular, the control circuit 70 may perform the bi-directional communication via the communication unit 76, via a communication gateway 79 of the base station 7 to an external network N and further to the external user interface UI, or even plural external user interfaces UI.

The external user interface UI may enable a user to set or adapt parameters of the weed control method and the weed control system 1, and to receive output information and notifications from the weed control system 1.

The bidirectional communication may include a wireless communication based on at least one of a cellular wireless network protocol, a wireless personal area network (WPAN) protocol and wireless local area network (WLAN) protocol.

The control circuit 70 may perform a bi-directional communication via the communication unit 76 with an external user device 80. In particular, the control circuit 70 may perform the bi-directional communication via the communication unit 76, via a communication unit 81 of the external user device 80.

The external user device 80 may include the communication unit 81 comprising at least one antenna, and an input/output unit 82.

The input-output unit 82 may be configured to output information to a user and to receive a user input. The input-output unit 82 may, for example include a touch sensitive display, on which a graphical user interface (GUI) is running.

The input-output unit 82, for example, output to a user, a notification on the target plant 12, whose size does not decrease. For example, the notification may include at least information on the associated location of the target plant 12 in the working area, thereby enabling the user to take further actions to suppress the persistent target plant 12. The weed control system 1 may be configured to guide the user to the location of each persistent target plant 12 in the working area that does not decrease in size over the predetermined time interval, using a respective navigation function of the external user device 80 and the map or the file storing the corresponding information on the target plant 12 and the associated location.

The external user device 80 may be configured to enable the user to input an identified location of a detected weed the user himself has detected as an additional target plant 12 for the weed control system 1. In particular, the user may guide the autonomous work device 2 to the identified location the additional target plant 12 using the external user device 80. The autonomous work device 2 may then use own positioning means, e.g. working based on sensor signals from the sensor 5 including a GNSS sensor, to compute the identified location of the additional target plant 12.

The user may use the external user device 80 to determine locations of target plant 12 and provide the determined locations to the weed control system 1.

The external user device 80 may be a computer, a notebook computer, a tablet computer or a smartphone.

The external network N may include at least one of a local area network (LAN), a wireless local area network (WLAN), a wide area network (WAN), and an internet-protocol (IP)-based network.

The control circuit 70 may include at least one integrated circuit (IC), application specific integrated circuit (ASIC), microcontroller, microprocessor, or signal processor.

The control circuit 70 may be configured to communicate via the communication unit 76 with at least the server S for performing some processing steps using cloud computing.

Figure 3:
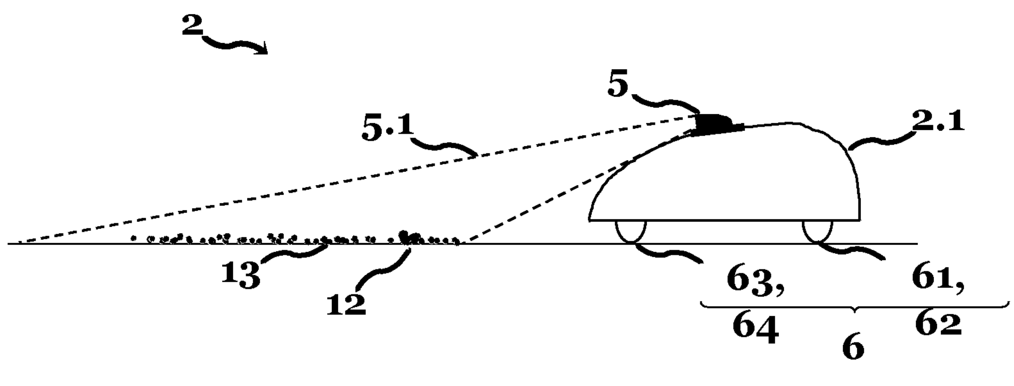
FIG. 3 illustrates image processing for an embodiment of the autonomous work device comprising a camera sensor.
Figure 3:
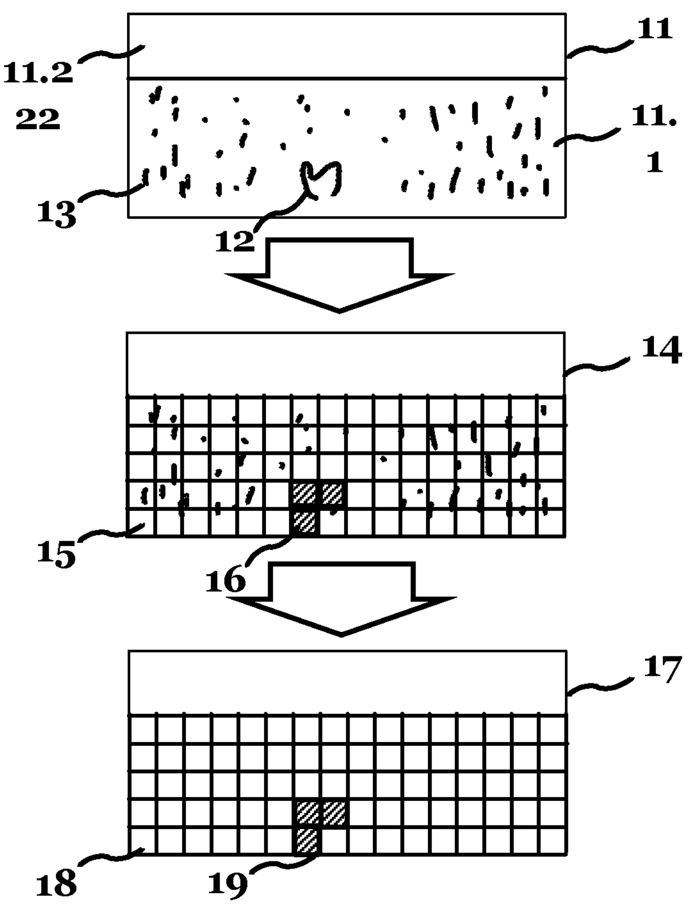

FIG. 3 illustrates image processing for an embodiment of the autonomous work device 2 comprising a camera sensor.

The camera sensor acquires image data using a digital camera mounted on top of the chassis 2.1 of the autonomous work device 2 and provides a sensor signal that, for example, includes a sequence of RGB images in the image signal. The weed control system 1 may process the sensor signal in the control circuit 70 of the autonomous work device 2 locally, or in at least one remote server S that the communication network N links to the autonomous work device 2.

The autonomous work device 2 arranges the camera sensor on an elevated position on top of the chassis 2.1 of the autonomous work device 2 facing forward, e.g. with spatial field-of-view 5.1 around a centre viewing axis essentially corresponding with a moving direction of the autonomous work device 2.

The autonomous work device 2 labels individual plants in the obtained RGB images, whether as a weed (unwanted weed) or as a crop plant (desired crop plant, e.g. grass). Identifying a weed species may not be necessary.

If the autonomous work device 2 is configured to perform weed species-specific measures for suppressing weed, the processing of the RGB images may include classifying a weed species in order to enable selecting measures for specific weed-species.

Known weed detection approaches may include four steps: acquiring images, pre-processing the acquired images, extracting features from the pre-processed images, and subsequently detecting and classifying the plants based on the extracted features.

A machine learning (ML)-based weed classification technique follows a corresponding sequence including acquiring images, pre-processing the acquired images extracting features, or, with feature selection, applying an ML-based classifier, and evaluating the performance.

Pre-processing may include, for example, image enhancement of the acquired images.

Classifying the plants may include discriminating between weed (unwanted weed) and crop plants (desired crop plants, e.g. grass).

Examples for weed detection using deep learning techniques from images may be implemented based on the techniques disclosed in A. S. M Mahmudul Hasan, Ferdous Sohel, Dean Diepeveen, Hamid Laga, and Michael G. k. Jones: "*A survey of deep learning techniques for weed detection from images*", May 2021. In: Computers and Electronics in Agriculture, May 2021.

The camera sensor obtains a sensor signal that comprises a sequence of RGB images. The camera view 11 of FIG. 3 represents one exemplary view from the camera sensor, which is pictured in an image (image frame) of the sequence of images.

The camera view 11 depicts in a lower portion 11.1 a ground area forming part of the working area imaging the ground within the field-of-view 5.1 of the camera sensor. The camera view 11 depicts in an upper portion 11.2 portions within the field-of-view 5.1 of the camera sensor that do not form part of the working area.

The camera sensor captures an image 14 depicting the current camera view 11 of the field-of-view 5.1 of the camera sensor.

The camera view 11 depicts a portion of the working area, which includes plants comprising wanted plants, e.g. grass plants 13 in a lawn area and one unwanted plant 12 (weed 12).

The captured image 14 (camera pixel image 14) depicts the region of the working area, which includes the wanted plants, e.g. grass plants 13 in the lawn area and the unwanted plant 12 (target plant 12, weed 12) within the camera view 11.

The control circuit 70 performs an image analysis of the captured image 14 that includes image pixels 15, which only include pixel data of grass plants 13, and image pixels 16, which include at least partially pixel data depicting at least portions of the weed 12.

Alternatively, the control circuit 70 may provide the captured image 14 via the network N to the server S for at least some of the steps of the image analysis.

The image analysis may include applying a ML-process on the camera pixel image 14.

The image analysis of the camera pixel image 14 may include a segmentation of weed areas and non-weed areas in the camera pixel image 14 on level of individual image pixels. The image analysis provides a segmented image 17 that classifies each pixel belonging to the working area included in the image 17 as a pixel classified either as a pixel 19 of a weed area or as a pixel 18 that is classified as a non-weed area.

Thus, the image analysis performs detection of weed 12 in the field-of-view 5.1 of the camera sensor.

The segmented image 17 including the position of the weed 12 in a 2D-image provides the base geometry for subsequently computing a 3D-position of the weed 12 relative to the camera sensor.

Figure 4:
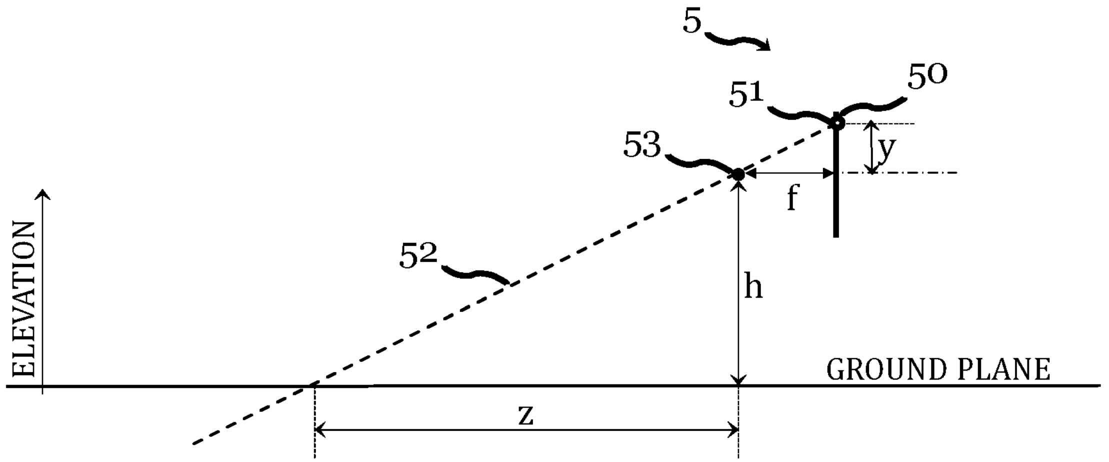
FIG. 4 illustrates a specific aspect of the image processing and location determination in an embodiment of the autonomous work device of FIG. 4.

FIG. 4 illustrates a specific aspect of the image processing in an embodiment of the autonomous work device of FIG. 4.

In particular, FIG. 4 illustrates computing the 3D-position of the detected weed 12 relative to the camera sensor included in the sensor means 5 based on the segmented image 17 including a 2D image position of the weed using basic geometrical considerations.

FIG. 4 depicts the camera sensor, e.g. a camera chip, including the camera image plane 50 arranged at a vertical height h above the ground plane. This corresponds to the arrangement of the sensor 5 on the autonomous work device 2 discussed with reference to FIGS. 2 and 3.

The ground plane may be assumed as a flat plane, which will provide sufficiently precise results for small horizontal distances in typical gardening applications.

FIG. 4 displays the ray-of-light 52 for one pixel 51 of the image plane 50 and a focal point 53 of the camera sensor. The geometry of the arrangement of FIG. 4 may be written as in equation (1)

$$\frac{z}{h} = \frac{y}{f}; \tag{1}$$

The horizontal distance z on the ground plane of the pixel 51 may be computed from rewriting equation (1) as $$z = \frac{y}{f}h; \tag{2}$$

with a focal length f of the camera sensor, the vertical height of the focal point 53 in vertical elevation above the ground plane, and a vertical distance y of the pixel 51 from the center axis of the image plane 50.

By evaluating equation (2) for each pixel 51 classified in the segmented image 17 as a pixel 19 of a weed area, a relative distance z for the respective detected weed 12 from the focal point 53 and from the camera plane 50 may be computed.

The camera sensor is arranged at a position on the autonomous work device 2, which is a priori known.

Thus, FIG. 4 illustrates the basic principle of the process of computing a relative 3D-position of the detected weed 12 with regard to the position of the autonomous working device 2 at the time of capturing the image based on the computed 2D-image position of the detected weed 12 in the segmented image 17.

The computed relative 3D-position of the detected weed 12 may be used subsequently to compute a trajectory for the autonomous work device 2 from its current position in the work area to the computed location of the detected weed 12. In particular, the computed trajectory for the autonomous work device 2 ends at a suitable position in which at least one of the wheels of the driving means 6 is positioned directly on the location of the detected weed 12 in the working area.

The invention claimed is:

1. A weed control method for an autonomous work device, wherein the autonomous work device comprises driving means configured to move the autonomous work device in an outdoor environment, sensor means configured to sense an environment of the autonomous work device and to generate a sensor signal based on the sensed environment, and a control circuit configured to control the driving means to navigate the autonomous work device in the environment based on the sensor signal, and the method comprising:

obtaining a location of a target plant in the environment, wherein obtaining the location of a target plant in the environment comprises detecting a plant in the environment based on the sensor signal, determining whether the detected plant is the target plant, and computing the location of the target plant, switching, by the control circuit, from a standard operating mode into a weed suppression mode, and controlling, by the control circuit, the driving means in the weed suppression mode, to position at least one wheel of the driving means on the computed location of the target plant and to perform a predetermined movement pattern of the autonomous work device while simultaneously maintaining the at least one wheel in an area at the location of the target plant, for exerting mechanical stress on the target plant, wherein performing the predetermined movement pattern comprises setting a rotational speed of the at least one wheel to zero and moving at least one other wheel with a rotational speed different from zero for a predetermined time or for a predetermined angle.

2. The weed control method according to claim 1, wherein obtaining the location of the target plant in the environment comprises obtaining, via a user interface, an input of a user including the location of the target plant.

3. The weed control method according to claim 1, wherein the method comprises recording the location of the identified target plant in a map stored in a memory.

4. The weed control method according to claim 3, wherein the method comprises switching the autonomous work device into operating in the weed suppression mode at predetermined time intervals, wherein, in the weed suppression mode, the method comprises retrieving recorded locations of the target plant in the work area from the map, moving the autonomous work device to each of the retrieved locations, performing at each of the retrieved locations, the steps of positioning at least one wheel of the driving means on the retrieved location of the target plant, performing the predetermined movement pattern of the autonomous work device while simultaneously maintaining the at least one wheel on the location of the target plant.

5. The weed control method according to claim 1, wherein the method comprises receiving, via an interface, data for defining desired plants and for defining weed from at least one of a manufacturer, a service provider and at least one user of the autonomous work device.

6. The weed control method according to claim 1, wherein the method comprises outputting, via a user interface, image information of the detected plant, receiving, via the user interface, a user input including information whether the detected plant is a desired plant or weed, and learning, a classifier used in the determining step to determine whether the detected plant is the desired plant or weed based on the received user input.

7. The weed control method according to claim 1, wherein the method comprises receiving a user input defining at least one movement parameter of the predetermined movement pattern for determining an amount of stress exerted by the autonomous work device on the target plant.

8. The weed control method according to claim 1, wherein the method comprises selecting at least one movement parameter of the predetermined movement pattern for determining an amount of stress exerted by the autonomous work device on the target plant based on at least one of a plant species of the target plant, a plant species of plants surrounding the target plant, and a region of a working area in which the target plant is located.

9. The weed control method according to claim 7, wherein the method comprises determining a size of the detected weed and storing the determined size of detected weed in association with the computed location of the detected weed, monitoring the stored size of the detected weed over a predetermined time interval, and in case the stored size of the detected weed increases or remains the same size, performing at least one of amending the at least one movement parameter of the predetermined movement pattern or selecting another predetermined movement pattern for increasing the amount of stress on the detected weed for the associated location, or outputting, to a user, a notification on the detected weed including at least information on the associated location of the detected weed.

10. The weed control method according to claim 1, wherein the sensor means comprises at least one camera sensor, and detecting the plant includes performing image processing of the sensor signal, in particular detecting the plant and determining the target plant using a classification algorithm or a deep neural network.

11. The weed control method according to claim 1, wherein the rotational speed different from zero corresponds essentially to a rotational speed of the wheel and the at least one other wheel during standard operation of the autonomous work device.

12. A non-transitory computer readable storage medium storing a program with program-code means for executing the steps according to claim 1, when the program is executed on a computer or a digital signal processor.

13. An autonomous work device comprising driving means configured to move the autonomous work device in an environment, sensor means configured to sense an environment of the autonomous work device and to generate a sensor signal based on the sensed environment, and a control circuit configured to control the driving means to navigate the autonomous work device in the environment based on the sensor signal, and wherein the control circuit is configured to obtain a location of a target plant in the environment by detecting a plant in the environment based on the sensor signal, determining whether the detected plant is the target plant, and computing the location of the target plant, and the control circuit is further configured to switch from the standard operation mode into a weed suppression mode, and to control the driving means to position at least one wheel of the driving means on the location of the target plant and to perform a predetermined movement pattern of the autonomous work device while simultaneously maintaining the at least one wheel in an area at the location of the target plant, for exerting mechanical stress on the target plant, wherein performing the predetermined movement pattern comprises setting a rotational speed of the at least one wheel to zero and moving at least one other wheel with a rotational speed different from zero for a predetermined time or for a predetermined angle.

14. A weed control system, comprising:

the autonomous work device according to claim 13; and an external user device, wherein the external user device is further configured to determine the location of the target plant based on an input of a user, and to transmit the determined location via a communication unit of the external user device to the autonomous work device.

* * * * *